G. AGNELLI.
DRIVING GEAR FOR MOTOR ROAD VEHICLES.
APPLICATION FILED JAN. 16, 1907.
1,050,049.
Patented Jan. 7, 1913.
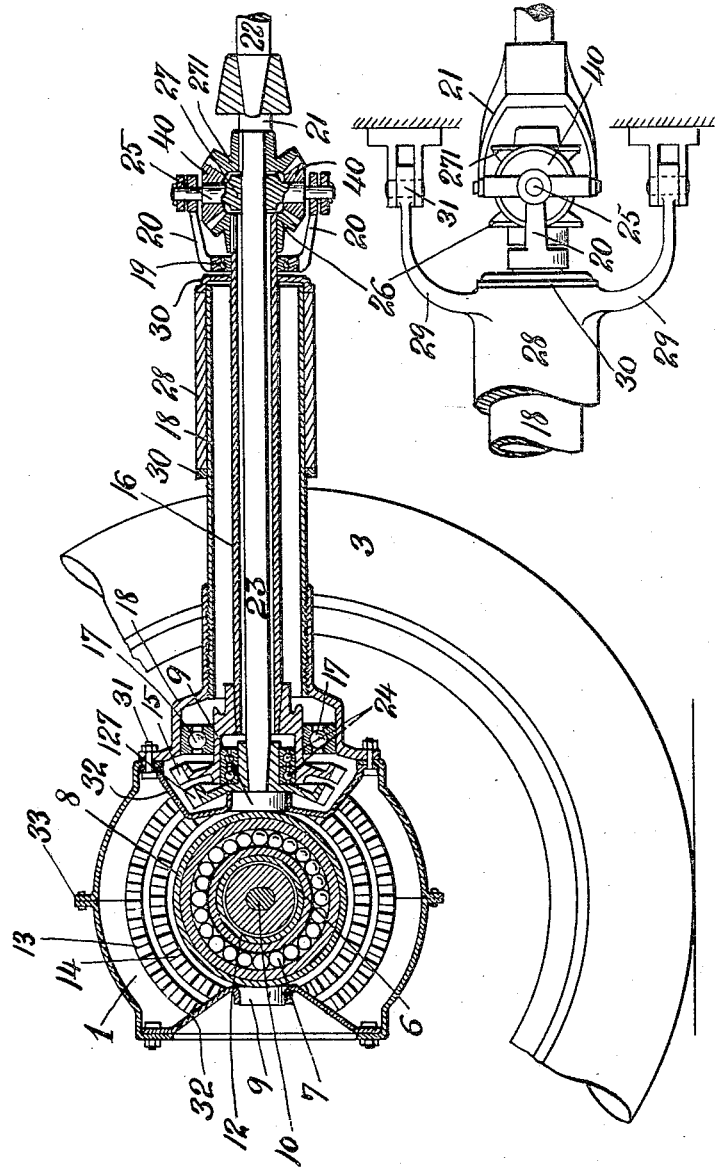
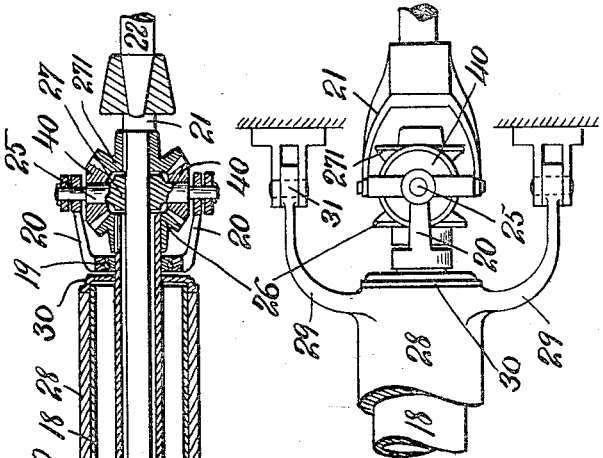

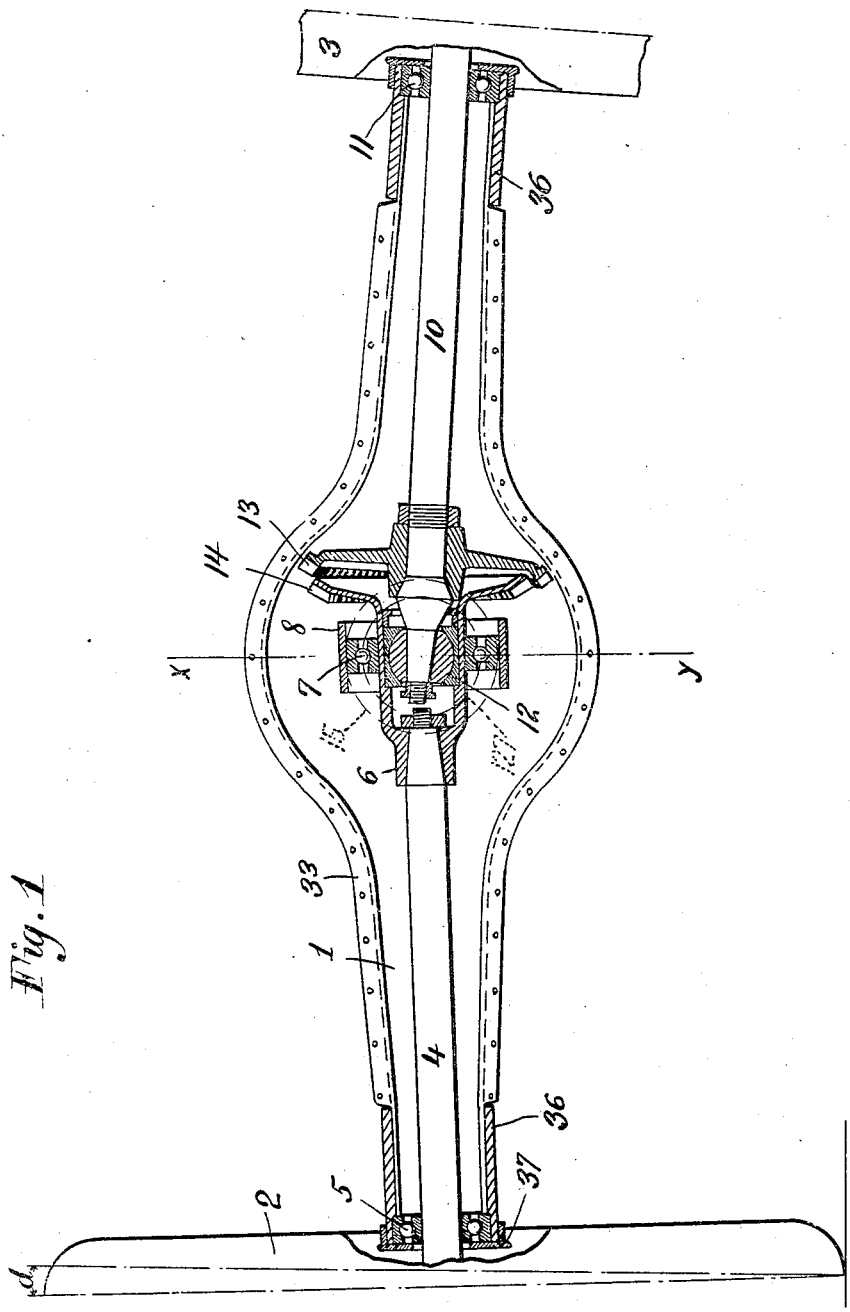

UNITED STATES PATENT OFFICE.

GIOVANNI AGNELLI, OF TURIN, ITALY, ASSIGNOR, BY MESNE ASSIGNMENTS, TO F. I. A. T., OF POUGHKEEPSIE, NEW YORK, A CORPORATION OF NEW YORK.

DRIVING-GEAR FOR MOTOR ROAD-VEHICLES.

1,050,049.  Specification of Letters Patent.  Patented Jan. 7, 1913.

Application filed January 16, 1907. Serial No. 352,630.

*To all whom it may concern:*

Be it known that I, GIOVANNI AGNELLI, a subject of the King of Italy, residing at Corso Dante 35, Turin, Italy, have invented certain new and useful Improvements in Connection with Driving-Gear of Motor Road-Vehicles, of which the following is a full, clear, and exact specification.

This invention relates to vehicle axles and has particular reference to shaft propelled vehicles comprising a motor, driving mechanism, and road wheels.

At the present time, the common practice is, in the case of shaft driven vehicles, to put the differential gearing directly on the rear axle, but there is an objection to this in that the weight is not well disposed and also the differential gearing is not readily accessible.

An object of this invention is to provide a driving gearing for a vehicle wherein the differential gearing may be removed from the driving axle, and disposed on the body of the vehicle, preferably adjacent the gear box, thereby securing a better distribution of weight and greater accessibility, and enabling the driving axle to be of lighter construction.

A further object of the invention is to provide improvements in the driving axle construction, whereby the driving wheels may be splayed.

Further objects of the invention reside in the construction and combinations of the various parts, all of which will more fully appear in connection with the following description of the accompanying drawings, wherein—

Figure 1 is a rear elevation of a vehicle embodying the invention; Fig. 2 is a longitudinal section showing the transmission shafts, and Fig. 3 is a detail of the differential gearing and the construction for transmitting the thrust to the frame.

Hinged horizontally on the frame at 31 is a yoke 29 having its hub 28 rotatably journaled between thrust collars 30 on reach rod tube 18, which latter is bolted to the rear axle 1, thus permitting the rear axle and associated parts to swing vertically about the pivots 31 and to oscillate with inequalities in the road on the axis of tube 18.

22 is the engine or driving shaft leading from the change gear (not shown) and carries at its rear end yoke 21 connected to diametrical parts of the Cardan joint spider 27 in the same plane as the pivots 31. At right angles thereto is pivoted a yoke 20 having a ball thrust bearing 19 on the hollow shaft 16 to resist the back thrust of the bevel pinions. Diametrically journaled on the spider 27 at 25 are differential pinions 40 which mesh respectively with bevel gear 26 on hollow shaft 16 and bevel gear 271 on shaft 23. It will thus be seen that a universal or Cardan connection is provided between shaft 22 and shafts 16 and 23, and at the same time there is provision for differential driving between shaft 22 and shafts 16 and 23. The shaft 16 has a thrust bearing 17 in the tubular reach rod 18, and has keyed at the rear end a bevel driving gear 15. The shaft 23 is similarly journaled in thrust bearings 24 between the hub of bevel gear 127 and that of gear 15, so that both of these shafts are journaled in the reach rod casing 18, and also independently to permit differential movement.

The entire driving gearing to the wheels is incased, and to this end, the tubular casing 18 is attached at one end to the front flanged half of the rear axle 1 by bolts 31', and at the front end is rotatably held between the thrust collars by yoke 29, pivoted, as before stated, on the frame at 31, and in the same plane as the universal joint. Without the rotatable bearing of reach rod tube 18 in yoke 28, the pivots 31 might be sheared off by one rear wheel being raised above the other in going over obstructions. Thereby the thrust, and strains due to obstructions, will be transmitted directly to the frame through the yoke, and not through the differential gearing and universal joint to the frame.

Meshing with the concentric gears 15 and 127, are gears 13 and 14, respectively driving the live shafts 10 and 4, and thereby the wheels 3 and 2, respectively.

11 and 5, are bearings for the wheel ends of the live shafts carried by the flanged and dished segments 1, 1, of the axle.

Journaled in trunnions 9 in cone-shaped plates 32 carried by the axle halves 1, is a ring 8, the axis of the trunnions being coincident with that of the shafts 16, 23. The hub 6 of gear 14 is journaled in ring 8 at bearing 7, and within hub 6 in a spherical block 12 is journaled the end of shaft 10, the horizontal axis of block 12 being also coincident with that of the trunnions 9.

Thus it will be seen that the angle of the shafts 10 and 4 can be varied as desired without loss of power, and at the same time the ends of shafts 10 and 4 will be universally supported, and their thrust is ultimately taken up by the trunnions 9 and the axle halves 1, 1, through block 12, bearing 7 and ring 8. Thus it is possible to drive splayed wheels from one differential coupling, and without loss of power, while at the same time, the differential is removed from the rear axle to the frame.

The rear axle herein described is made out of two stamped plates 1 having flanges 33 bolted together preferably vertically through the flanges whereby the flanges 33 in combination with the dished formation of the segments prevent distortion or bending of the axle, and entirely obviate the use of tie rods. Also, adjacent the ends of the axle 1, will be secured the usual rear springs for supporting the body (not shown). As shown in Fig. 1, the flanges are cut away near the ends of the segments, and collars 36 secured on the outside of the segments. The stationary ball race of bearings 5 and 11 are held inside these collars and against the ends of the segments 1 by screw caps 37 threaded on collars 36.

It is thought that the operation of the mechanism will be obvious from the description, and that no further explanation is necessary. It will therefore be seen that by this invention, a shaft driven machine is provided in which the differential gearing is removed from the rear axle and thereby rendered more accessible, as well as producing a better distribution of weight. Also it will be seen that the differential gearing is combined with a universal joint, obviating the necessity of providing a separate universal joint between the body and the axle. Furthermore, by this invention, the driven wheels can be splayed as much as may be desired, without requiring universal joints between the live shafts and their respective wheels.

I do not claim herein the novel construction of rear axle composed of flanged stampings or plates, as the same is made the subject-matter of a divisional application filed by me December 15, 1909, No. 533,149.

The specific construction herein described may be varied without departing from the broad features of the invention, and various modifications and changes may be made.

Having thus described my invention, I declare that what I claim as new and desire to secure by Letters Patent, is—

1. The combination with a vehicle frame having a driving shaft, of a plurality of driven shafts, a universal joint and differential gearing connecting said driving shaft and said driven shafts, means for pivotally supporting said driven shafts independently of said driving shaft and of said universal joint and differential gearing, and a plurality of oppositely extending axles adapted to be separately and differentially driven by said driven shafts.

2. The combination with a vehicle frame having a driving shaft, of a plurality of driven shafts concentric with each other, a universal joint and differential gearing having a common center connecting said driving shaft with said driven shafts, means for pivotally supporting said driven shafts, said driven shafts being each provided with a bevel gear at its end, and a plurality of axles inclined to each other, each of said axles having a bevel gear meshing respectively with said bevel gears.

3. The combination with a vehicle frame having a driving shaft, of a plurality of driven shafts concentric with each other, a universal joint and differential gearing connecting said driving shaft with one end of each of said driven shafts, a bevel gear secured to each of said driven shafts at its other end, a common housing for said driven shafts, and bearings for taking up the thrust between said housing and said driven shafts.

4. The combination with a vehicle frame having a driving shaft, of two driven shafts concentric with each other, a universal joint and differential gearing connecting said driving shaft with one end of each of said driven shafts, a bevel gear secured to each of said driven shafts at its other end, a common housing for said driven shafts, a pivotal support for said housing, and two axles inclined to each other and having respectively a bevel gear in mesh with one of said bevel gears secured to said driven shafts.

5. The combination with a vehicle frame having a driving shaft, of two driven shafts concentric with each other, a universal joint and differential gearing connecting said driving shaft with one end of each of said driven shafts, said driven shafts having each at its other end a bevel gear, a common housing for said driven shafts, a pivotal support for said housing, two axles inclined to each other and having respectively a bevel gear in mesh with said bevel gear secured to said driven shafts, and thrust bearings between said driven shafts and said housing.

6. The combination with a vehicle frame having a driving shaft, of two driven shafts concentric with each other, a universal joint and differential gearing connecting said driving shaft with said driven shafts at one end thereof, said driven shafts having each at its other end a bevel gear, a separate pivotal support for said driven shafts, two axles inclined to each other and having respectively a bevel gear in mesh with one of said bevel gears secured to said driven shafts, and a common bearing for the adjacent ends of said inclined axles.

7. The combination with the frame of a vehicle, of an engine shaft thereon, an axle structure carrying a live shaft, a wheel driven thereby, a bevel gear for driving said live shaft, a shaft carrying said bevel gear and connected to said engine shaft by a universal joint, and a reach rod casing inclosing said shaft connected at one end to said axle, a yoke rotatably connected to the other end of said casing, means preventing relative longitudinal movement between said casing and said yoke, and a horizontal, pivotal connection between the ends of said yoke and the frame in the plane of said universal joint.

8. The combination with the frame of a vehicle, of an engine shaft thereon, an axle structure carrying a plurality of live shafts, wheels driven thereby, bevel gears for driving said live shafts, concentric shafts carrying said bevel gears and connected to said engine shaft by a combined universal joint and differential gear having a common center, and a reach rod casing inclosing said shafts connected at one end to said axle structure and at the other end hinged to the frame on an axis including the centers of said universal joint and differential gear.

In witness whereof, I have hereunto signed my name in the presence of two subscribing witnesses.

GIOVANNI AGNELLI.

Witnesses:
L. ENNIS MARSHEN,
FELICE BAZETTA.